Oct. 25, 1932.  J. F. WINDSOR  1,884,467
MEANS TO REDUCE THE BURRS OF WELDED METAL TUBING
Filed Nov. 4, 1930
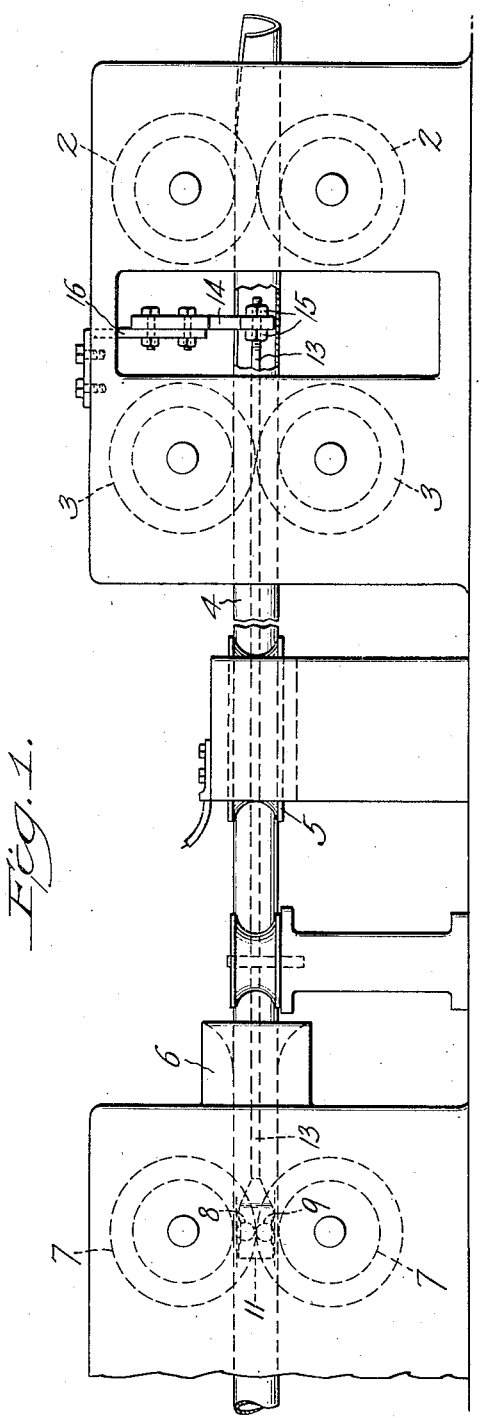
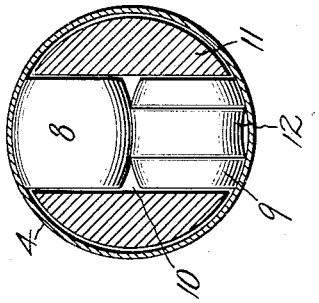
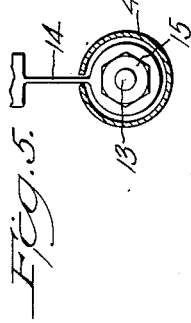
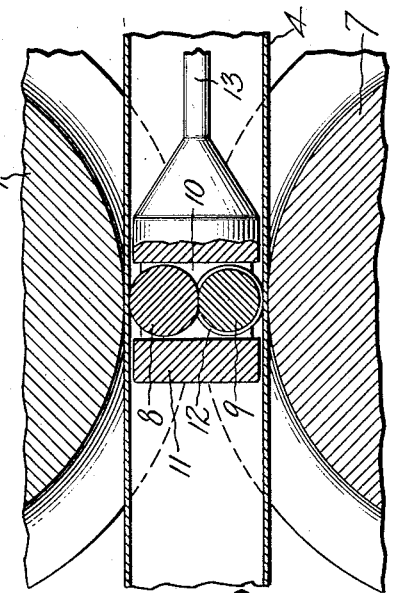
Inventor
JOHN F. WINDSOR
By his Attorney
Clarence D Kerr Patented Oct. 25, 1932

1,884,467

UNITED STATES PATENT OFFICE

JOHN F. WINDSOR, OF CHICAGO, ILLINOIS, ASSIGNOR, BY MESNE ASSIGNMENTS, TO CLAYTON MARK & COMPANY, OF CHICAGO, ILLINOIS, A CORPORATION OF DELAWARE

MEANS TO REDUCE THE BURRS OF WELDED METAL TUBING

Application filed November 4, 1930. Serial No. 493,255.

This invention relates to the butt-welding of metal tubing and is more particularly concerned with the provision of means simple in construction and highly effective in operation for smoothing down the burrs which occur as an incident to welding. I shall describe herein an embodiment of my invention and shall point out the novel features thereof in claims.

In the accompanying drawing:

Fig. 1 is a view in side elevation illustrating welding apparatus having an embodiment of my invention applied thereto.

Fig. 2 is an enlarged detail view in vertical longitudinal section, partly in elevation, showing said embodiment in operating position.

Fig. 3 is a detail plan view.

Fig. 4 is a detail view in transverse vertical section, partly in elevation.

Fig. 5 is a vertical transverse sectional view, partly in elevation, of a further detail.

In the manufacture of butt-welded tubing, it is customary to form flat metal stock or skelp into tubular shape, with the edges of the skelp adjacent each other, by passing the skelp through a series of pairs of "forming rollers", two of such pairs being indicated in the drawing at 2—2, and 3—3, respectively. Upon emerging from the forming rollers, the tube stock 4 is passed between rollers which compress the stock so that its edges are forced into firm engagement with each other and pass current through said edges, whereby the latter are welded together. At 5 there is indicated a horizontal welding roller which, in conjunction with a similar horizontal roller on the opposite side of the tube stock, supports the latter, presses the edges into firm contact, and passes current across the seam formed by said edges. The welded tube, after leaving the welding rollers, passes through a sizing or finishing die 6 and thence between pairs of finishing or sizing rollers, as indicated at 7—7. Apparatus of the character above set forth for the production of butt-welded tubing is well known in the art, and further description thereof is unnecessary to an understanding of my invention. The welding of the tubing frequently produces a burr of metal protruding both exteriorly and interiorly of the tube along the seam, and the sizing or finishing rolls, which engage the outside of the tube, apply pressure thereto and remove the exterior burr by smoothing down or pressing the metal of said burr over the adjacent exterior tube periphery. I have provided means for removing or smoothing down the burr on the interior of the tube which means is constructed substantially as follows:

Mounted within the tube between the rolls 7, 7, are rollers 8, 9, one on top of the other. Said rollers 8, 9, firmly engage the interior of the tube. The peripheries of said rollers are curved to conform with the inner circumference of the tube, as indicated in Fig. 4. It will be seen that under the pressure applied to the tube by the rolls 7, 7, not only is the exterior burr removed but also the interior burr is effectively smoothed out by the roller 8.

An important feature of my invention resides in the provision in the roller 9 of a circumferential groove 12, curved to conform with the periphery of the roller 8 and receiving said roller, as shown in Figs. 2 and 4. The rollers 8, 9, are, of course, of harder material than that of the tube stock. By the provision of the groove 12 I enable the roller 8 to nest within the roller 9 along a comparatively wide arc of contact. In other words, I provide a substantial line contact between the rollers, as a result of which wear upon the rollers is materially lessened and the life of the rollers substantially increased as compared with arrangements wherein a mere point contact is provided between rollers.

The rollers 8, 9 are positioned within a chamber 10 in a member 11 located within the tube and having a stem 13. Said member and stem may be conveniently fastened in position in the tube by means of an arm 14 secured to the stem by nuts 15 threaded on one end of the stem, said arm at its upper end being fastened to a bracket 16 on the frame in which the forming rolls are mounted. The arm 14 is shown extending into the tube stock through the gap between adjacent edges of the stock, said edges prior to passage through the rolls 3—3, being a sufficient distance apart to permit the arm 14 to pass therebetween.

A further feature of my invention resides in the fact that the axes of the rollers 8, 9, are not fixed and that instead said rollers are free to float in the chamber 10. A smoother and more effective action of the rollers, free from binding, is thereby obtained in the rolling down of the interior burr. Also, it may be noted that said rollers are supported directly by the tube stock itself and not by the member 11.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an apparatus for smoothing down the burrs of butt-welded metal tubing, a pair of sizing rolls cooperating with the exterior of the tube, and a pair of rolls on the interior of the tube between said sizing rolls, one of the rolls on the interior of the tube having a circumferential groove in which the other of said interior rolls is received.

2. In an apparatus for smoothing down burrs on butt-welded metal tubing, a pair of rolls inside said tube and having peripheries curved to conform to the inner circumference of the tubing, one of said rolls having a circumferential groove shaped to conform to the periphery of the other of said rolls and receiving the latter, and an element within the tubing provided with a chamber in which said rolls are floatably mounted.

3. In an apparatus for smoothing down burrs on butt-welded metal tubing, a pair of rollers, one positioned on top of the other, within said tubing, one of said rollers having a circumferential groove in which the other of said rollers is received, a member having a chamber in which said rollers are floatably mounted, and a pair of rolls for applying pressure to the exterior of the tube stock above and below said rollers.

In testimony whereof, I have signed my name to this specification this 1st day of November, 1930.

JOHN F. WINDSOR.